US007732753B2

(12) United States Patent
Greiner

(10) Patent No.: US 7,732,753 B2
(45) Date of Patent: Jun. 8, 2010

(54) ILLUMINATION SYSTEM HAVING A LIGHT-TRANSMISSIVE PLATE WITH SURFACE-MODIFICATION STRUCTURES

(75) Inventor: Horst Greiner, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 43 days.

(21) Appl. No.: 11/997,481

(22) PCT Filed: Jul. 26, 2006

(86) PCT No.: PCT/IB2006/052564

§ 371 (c)(1),
(2), (4) Date: Jan. 31, 2008

(87) PCT Pub. No.: WO2007/015195

PCT Pub. Date: Feb. 8, 2007

(65) Prior Publication Data

US 2008/0217510 A1 Sep. 11, 2008

(30) Foreign Application Priority Data

Aug. 2, 2005 (EP) .................................. 05107113

(51) Int. Cl.
*G06M 7/00* (2006.01)
*G01J 1/04* (2006.01)
(52) U.S. Cl. .................. 250/221; 250/227.11
(58) Field of Classification Search ........... 250/205, 250/208.1, 221, 226, 216, 227.11, 227.31; 345/76, 77, 81, 82, 84, 63, 32, 207, 690, 345/697, 211, 212, 204; 315/10; 362/551, 362/552, 555, 561, 330, 800

See application file for complete search history.

(56) References Cited

U.S. PATENT DOCUMENTS

| 5,490,005 A * | 2/1996 | Jueliger .................. 349/116 |
| 6,689,999 B2 | 2/2004 | Haines et al. |
| 6,741,351 B2 | 5/2004 | Marshalls et al. |
| 6,753,661 B2 | 6/2004 | Muthu et al. |

(Continued)

FOREIGN PATENT DOCUMENTS

EP 0156271 A1 2/1985

(Continued)

*Primary Examiner*—Que T Le
*Assistant Examiner*—Pascal M Bui-Pho
(74) *Attorney, Agent, or Firm*—Mark L Beloborodov

(57) ABSTRACT

The illumination system has a plurality of light sources (R, G, B), a light-transmissive light-sensing plate (5) and surface-modification structures (21, 22) provided at a limited number of pre-determined locations on a surface of the light-sensing plate (5). The surface-modification structures divert a portion of the light traveling through the light-sensing plate. The diverted light is guided towards an edge surface (15, 16) of the light-sensing plate, where at least one light sensor (11, 12) senses the diverted light. A first light sensor (11) preferably receives diverted light substantially exclusively from the first surface-modification structures (21), whereas the second light sensor (12) receives diverted light substantially exclusively from the second surface-modification structures (22). Alternatively, the illumination system further comprises a light-mixing chamber having a light-emission window for illuminating a display device, the light-sensing plate being arranged in the light-mixing chamber between the light source and the light-emission window.

8 Claims, 5 Drawing Sheets

U.S. PATENT DOCUMENTS

| | | |
|---|---|---|
| 7,223,958 B2 * | 5/2007 | Nakajima et al. ........... 250/216 |
| 7,497,610 B2 * | 3/2009 | Sugiura et al. .............. 362/620 |
| 2004/0041756 A1 * | 3/2004 | Henmi et al. ................. 345/76 |
| 2004/0070966 A1 * | 4/2004 | Ahn et al. .................... 362/31 |
| 2004/0113040 A1 | 6/2004 | Compain |
| 2004/0113044 A1 | 6/2004 | Ishiguchi et al. |
| 2004/0119908 A1 | 6/2004 | Sakai |
| 2006/0243893 A1 * | 11/2006 | Ng et al. ................. 250/227.11 |
| 2007/0222741 A1 * | 9/2007 | Itaya ......................... 345/102 |

FOREIGN PATENT DOCUMENTS

| | | |
|---|---|---|
| EP | 1122559 A2 | 8/2001 |
| JP | 2004021147 | 1/2004 |
| WO | 9312515 | 6/1993 |

* cited by examiner

ILLUMINATION SYSTEM HAVING A LIGHT-TRANSMISSIVE PLATE WITH SURFACE-MODIFICATION STRUCTURES

The invention relates to an illumination system comprising at least one light source, a light-sensing plate and at least one light sensor.

The invention also relates to a light-sensing plate for use in such an illumination system.

The invention further relates to a display device comprising such an illumination system.

Such illumination systems are known per se. They are used, inter alia, for general lighting purposes, such as spot lights, flood lights and for large-area direct-view light-emitting panels applied, for instance, in signage, contour lighting, and billboards. The illumination systems are further used as task light.

Such illumination systems are also used, inter alia, as backlighting of (image) display devices, for example, for television receivers and monitors. These systems can be particularly used suitably as a backlight for non-emissive displays, such as liquid crystal display devices, also referred to as LCD panels, which are used in (portable) computers, (cordless) telephones or remote-control units. Another application area of the illumination system according to the invention is its use as an illumination source in a digital projector, or beamer, for projecting images or displaying television programs, films, video programs, or a DVD, or the like.

Generally, such illumination systems comprise a multiplicity of light sources, for instance, light-emitting diodes (LEDs). LEDs may be light sources of distinct primary colors, such as, for example, the well-known red (R), green (G), or blue (B) light emitters. In addition, the light emitter may have, for example, amber (A), magenta or cyan as primary colors. These primary colors may be generated either directly by the light-emitting diode chip, or by a phosphor upon irradiance with light of a shorter wavelength (e.g. green, blue or UV-light) from the light-emitting diode chip. In the latter case, also the use of mixed colors or white light is possible as one of the primary colors. Generally, the light emitted by the individual light sources is mixed so as to obtain a uniform distribution of the light while eliminating the correlation of the light emitted by the illumination system with a specific light source.

US Patent Application Publication US-A 2004/0123044 discloses a light source unit including a light source having LED chips for emitting different colors of light, and an optical light sensor for detecting light from a light mixer. A light source control section controls, by feedback control, the luminance of each LED chip in accordance with values detected by the optical light sensor. The light source unit also includes a temperature control section for controlling the temperature of the light source. The temperature control section is a feedback control system. Keeping the light source at a constant temperature allows suppressing spectrum changes of the LED chips with temperature, thereby suppressing changes in the luminance and chromaticity of the light source unit.

The known illumination system has the drawback that controlling of the light source of the illumination system is relatively inefficient.

The invention has for its object to eliminate the above-mentioned drawback wholly or partly. According to the invention, this object is achieved by an illumination system comprising:

at least one light source, a light-transmissive light-sensing plate, with light emitted by the at least one light source traveling through the light-sensing plate, surface-modification structures provided at least one pre-determined location on a surface of the light-sensing plate, the surface-modification structures diverting a portion of the light traveling through the light-sensing plate, the diverted light being guided towards an edge surface of the light-sensing plate, at least one light sensor coupled to the edge surface of the light-sensing plate for sensing the light diverted at the surface-modification structures, the at least one light sensor being coupled to a control means for controlling the luminous flux of the at least one light source.

The light-transmissive light-sensing plate according to the invention has the advantage that light at (only) pre-determined locations on the light-transmissive light-sensing plate is collected only at pre-determined locations without substantially disturbing the distribution of the light traveling through the light-sensing plate. In the known illumination system, the light sensor is attached to the edge of the light-exit window and this light sensor receives light which travels through the light-exit window without being able to determine or influence which part of the light traveling through the light-exit window contributes to the light received by the light sensor. To be able to probe the light traveling through the light-exit window at a certain location on the light-exit window in the known illumination system, the light sensor would have to be mounted at that location. However, this arrangement of the light sensor would block the transmission of the light through the light-exit window at that location, which is undesirable. The light-sensing plate of the illumination system according to the invention senses or probes only the light traveling through the light-sensing plate at certain pre-determined locations. At all other locations on the light-sensing plate, the light emitted by the at least one light source travels through the light-sensing plate without disturbance. Of course, the light traveling through the light-transmissive light-sensing plate experiences refraction of light at a light-ingress surface and at a light-egress window of the light-sensing plate, which refraction is caused by the change in refractive index between air and the material of the light-transmissive light-sensing plate, but a light ray traversing the light-sensing plate does not generally change its direction. Measuring the light intensity at the edge of the light-exit window has the disadvantage that this value, which is due to "edge" effects, is not necessarily representative of the light intensities and distribution in the central part of the light-exit window, which are the quantities relevant for the application.

The light is diverted by refraction, diffraction and/or scattering at the surface-modification structures. The direction of the light traveling through the light-sensing plate is changed by the surface-modification structures. If the angle of the light with the direction vertical to the light-sensing plate is changed in such a way that it is larger than the critical angle, which is approximately 42° for glass or PMMA, the light cannot escape from the light-sensing plate and will generally be reflected until it reaches an edge surface of the light-sensing plate. Propagation of light by means of such multiple reflections is generally referred to as total internal reflection (TIR).

The illumination system according to the invention is simple, relatively easy to manufacture, relatively easy to use, and also relatively inexpensive. Moreover, the illumination system according to the invention allows relatively efficient control of the light emitted by the at least one light source.

Examples of surface-modification structures are dots, indenting or protruding portions of, for example, a pyramidal shape, or slits, holographic, diffractive or any other suitable structures.

In order to minimize the distribution of light at the location of the surface-modification structures as compared with the remainder of the light-sensing plate, the light diverted at the surface-modification structures should preferably be relatively small. To this end, a preferred embodiment of the illumination system according to the invention is characterized in that the portion of the light refracted at the surface-modification structures is less than 5% of the total amount of light traveling through the light-sensing plate. The portion of the light traveling through the light-sensing plate diverted at the surface-modification structures should be adequate to yield a sufficient light input to the optical sensors. The amount of light diverted into the light-sensing plate can be controlled by the nature and spatial extent of the diverting elements. In practice, a small percentage of the light impinging on the light-sensing plate is enough for this purpose.

A preferred embodiment of the illumination system according to the invention is characterized in that a first and a second light sensor are coupled to a first and a second edge surface of the light-sensing plate, respectively, wherein first and second surface-modification structures are arranged at pre-determined locations on the surface of the light-sensing plate, the first light sensor receiving diverted light substantially exclusively from the first surface-modification structures, and the second light sensor receiving diverted light substantially exclusively from the second surface-modification structures. This is a favorable embodiment of the illumination system according to the invention. In this manner, the first light sensor probes the light distribution at a first pre-determined location, whereas the second light sensor probes the light distribution at a second pre-determined location, the predetermined locations being defined by the arrangement of the first and second surface-modification structures, respectively.

The illumination system in accordance with this preferred embodiment of the invention allows localizing detection of the light distribution of the light traveling through the light-sensing plate. In this manner, the light emitted by the at least one light source can be controlled effectively.

Another preferred embodiment of the illumination system according to the invention is characterized in that the at least one light sensor has a field of view for receiving diverted light falling within the field of view of the at least one light sensor. In this embodiment, the light sensor receives light substantially only from the surface-modification structures which are in the line of sight of the light sensor.

The at least one light source preferably comprises a plurality of light-emitting diodes of distinct primary colors or of a single primary color. Generally, each light-emitting diode requires tuning, the surface-modification structures collecting information of the light distribution at pre-determined locations for optimal input for the control means controlling the luminous flux of the plurality of light sources. The illumination system is particularly effective if a plurality of light sources with distinct primary colors has to be fine-tuned so as to realize the appropriate mix of light emitted by the illumination system.

A favorable embodiment of the illumination system according to the invention is characterized in that the illumination system further comprises a light-mixing chamber having a light-emission window, the light-sensing plate being arranged in the light-mixing chamber between the at least one light source and the light-emission window. In this embodiment, the light emitted by the at least one light source is confined and mixed in the light-mixing chamber and emitted by the illumination system via the light-emission window. The light-sensing plate may be constructed and arranged in such a way in the light-mixing chamber that all the light emitted by the at least one light source travels through the light-sensing plate.

The light-sensing plate preferably forms an integral part of the light-emission window. This simplifies the design of the illumination system. In this embodiment, the light-emission window of the illumination system is provided with the surface-modification structures, preferably at a plurality of pre-determined locations. These surface-modification structures divert a portion of the light traveling through the light-emission window of the light-mixing chamber, and the diverted light is guided towards an edge surface of the light-mixing chamber. The light-sensing plate may be arranged, for instance, just in front of the light-exit window (which is a semi-transparent scattering plate in many cases), separated from the latter by a small air gap.

The invention also relates to a light-sensing plate for use in such an illumination system.

The invention also relates to a display device comprising such an illumination system. The display device is preferably a liquid crystal display device.

These and other aspects of the invention are apparent from and will be elucidated with reference to the embodiments described hereinafter.

In the drawings.

The Figures are purely diagrammatic and not drawn to scale. Notably, some dimensions are shown in a strongly exaggerated form for the sake of clarity. Similar components in the Figures are denoted as much as possible by the same reference numerals.

Figure 1:
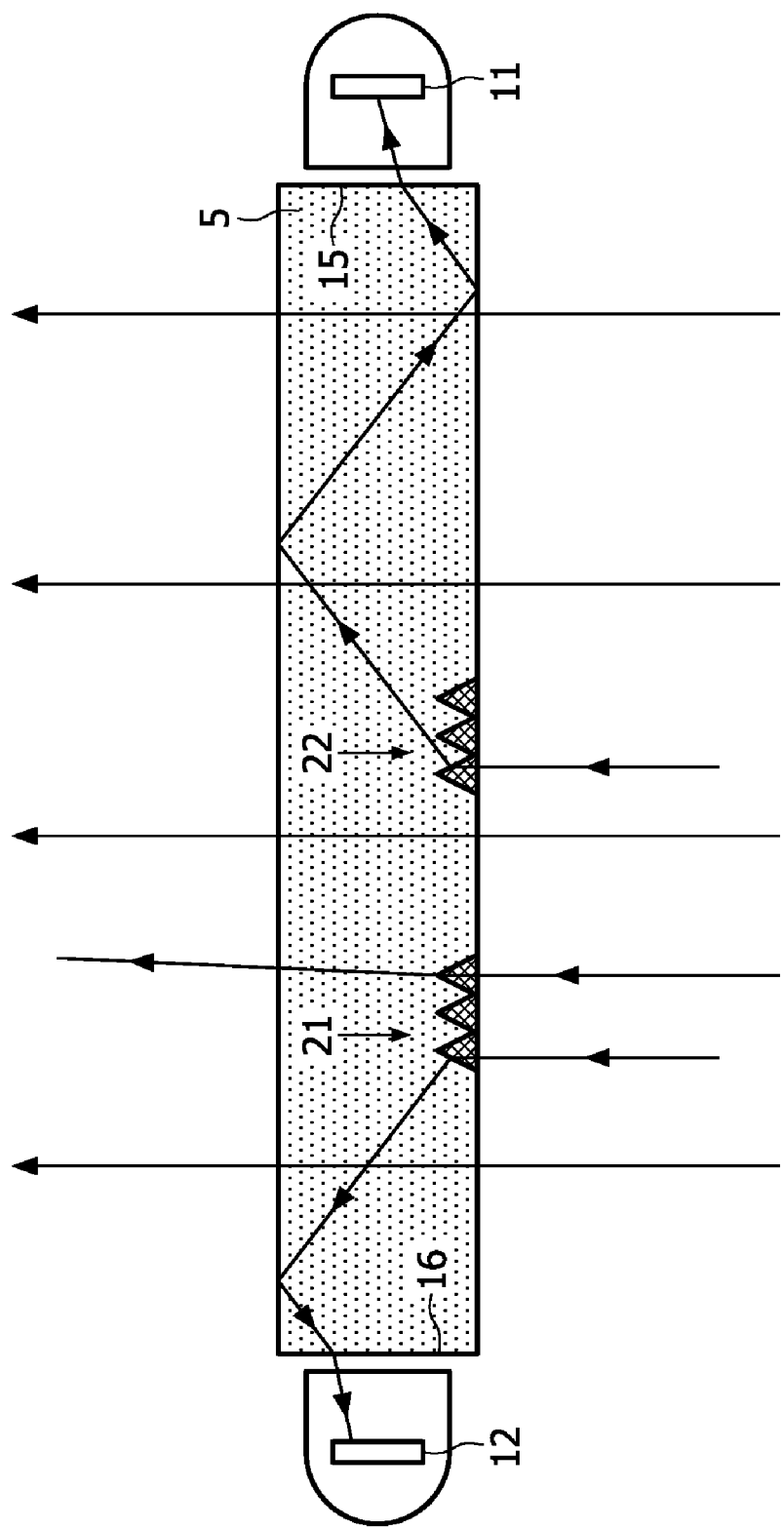
FIG. 1 is a side view of a light-sensing plate of an embodiment of the illumination system according to the invention.

FIG. 1 is a schematic side view of a light-sensing plate of an embodiment of the illumination system according to the invention. The illumination system comprises at least one light source (not shown in FIG. 1). Vertical arrows indicate light rays emitted by the at least one light source traveling through the light-transmissive light-sensing plate 5. The light-sensing plate 5 is made from a light-transmissive material, for example, glass or plastic such as PMMA. In the example of FIG. 1, a first light sensor 11 is coupled to a first edge surface 15 of the light-sensing plate 5; in addition, a second light sensor 12 is coupled to a second edge surface 16 of the light-sensing plate 5. Coupling of the light sensor 11 to the light-sensing plate 5 may be obtained either directly or indirectly. An example of the latter case is an optical fiber coupled to an edge surface guiding the light emitted at the light surface to the optical sensor. The first and second light sensors 11, 12 are coupled to an (electronic) control means (not shown in FIG. 1) for suitably adapting the luminous flux of the light source to the desired brightness and/or color point. The light sensors and the control means provide a feedback arrangement for influencing both the quality and the quantity of the light emitted by the illumination system. Sensing can be performed in many manners. Individual colors can be measured sequentially by suitable pulsing the light source and/or by employing suitable color filters.

The light-sensing plate 5 is provided with surface-modification structures 21, 22. According to the invention, these surface-modification structures are provided at least one pre-determined location on a surface of the light-sensing plate 5. In the example of FIG. 1, first and second surface-modification structures 21, 22, respectively, are arranged at pre-determined locations on the surface of the light-sensing plate 5. In the example of FIG. 1, these surface-modification structures 21, 22 are provided at a side of the light-sensing plate 5 facing the light source. In an alternative embodiment, the surface-modification structures are provided at a side of the light-sensing plate facing away from the light source. In a further alternative embodiment, the surface-modification structures are provided inside the light-sensing plate. Surface-modification structures are well known in the art. Examples of surface-modification structures are dots, indenting or protruding portions of, for example, a pyramidal shape, or slits, holographic, diffractive or any other suitable structures. The surface-modification structures are preferably patterned, non-scattering and/or reflect predominantly specularly or exhibit a non-Lambertian reflection.

A portion of the light traveling through the light-sensing plate 5 is diverted at the surface-modification structures 21, 22 provided on or in the light-sensing plate 5. Light is diverted at the surface-modification structures 21, 22 by refraction, diffraction and/or scattering. The diverted light is guided, for instance, by means of total internal reflection, towards the first or the second edge surface 15, 16 of the light-sensing plate 5. In the example of FIG. 1, light diverted at the first surface-modification structures 21 is preferentially guided towards the first edge surface 15, whereas light diverted at the second surface-modification structures 22 is preferentially guided towards the second edge surface 16. As the first light sensor 11 is coupled to the first edge surface 15 of the light-sensing plate 5, the first light sensor 11 receives diverted light substantially exclusively from the first surface-modification structures 21. As the second light sensor 12 is coupled to the second edge surface 16 of the light-sensing plate 5, the second light sensor 12 receives diverted light substantially exclusively from the second surface-modification structures 22.

Preferably, only minute amounts of the light traveling through the light-sensing plate 5 are diverted at the surface-modification structures 21, 22. The light diverted at the surface-modification structures 21, 22 is preferably less than 5% of the total amount of light traveling through the light-sensing plate 5. The amount of diverted light is just enough to supply the optical sensors at the rim of the light guide plate with sufficient optical input and is of the order of a few percent of the total amount of light traversing the light guide plate. Especially for illumination systems which have a relatively high light output, the amount of diverted light is (completely) negligible.

Figure 2:
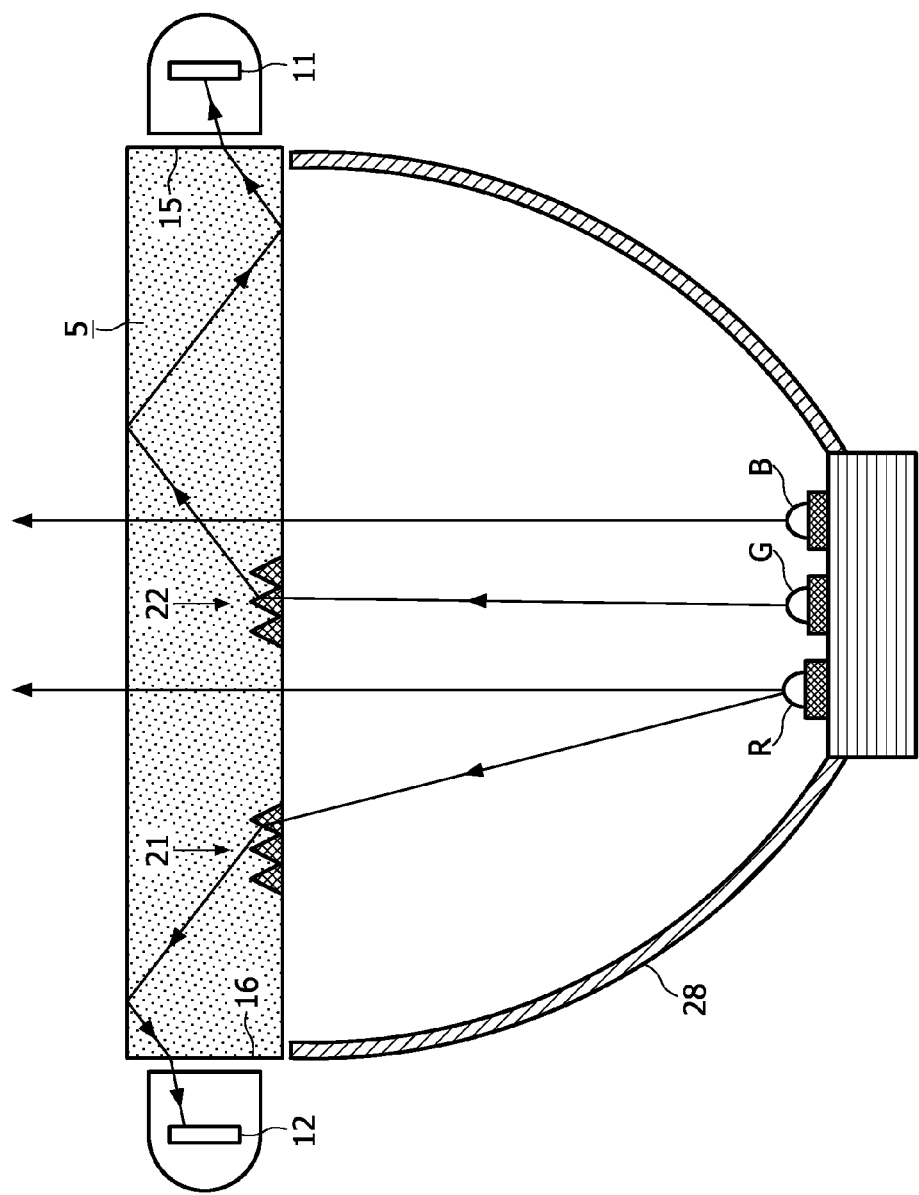
FIG. 2 is a side view of the luminaire including an embodiment of the illumination system according to the invention.

FIG. 2 is a schematic side view of the luminaire including an embodiment of the illumination system according to the invention. In the example of FIG. 2, the at least one light source comprises a plurality of light-emitting diodes (LEDs) R, G, B of distinct primary colors. Alternatively, the plurality of LEDs may also be a plurality of white LEDs. The light emitted by the plurality of LEDs is guided towards the light-sensing plate 5 by means of a reflector 28. In the embodiment shown in FIG. 2, all the light emitted by the LEDs R, G, B travels through the light-sensing plate 5, whereas only a minute portion of the light traveling through the light-sensing plate 5 is diverted at the surface-modification structures 21, 22. In the example of FIG. 2, light diverted at the first surface-modification structures 21 is preferentially guided towards the first edge surface 15 coupled to the first light sensor 11, whereas light diverted at the second surface-modification structures 22 is preferentially guided towards the second edge surface 16 coupled to the second light sensor 12.

Figure 3:
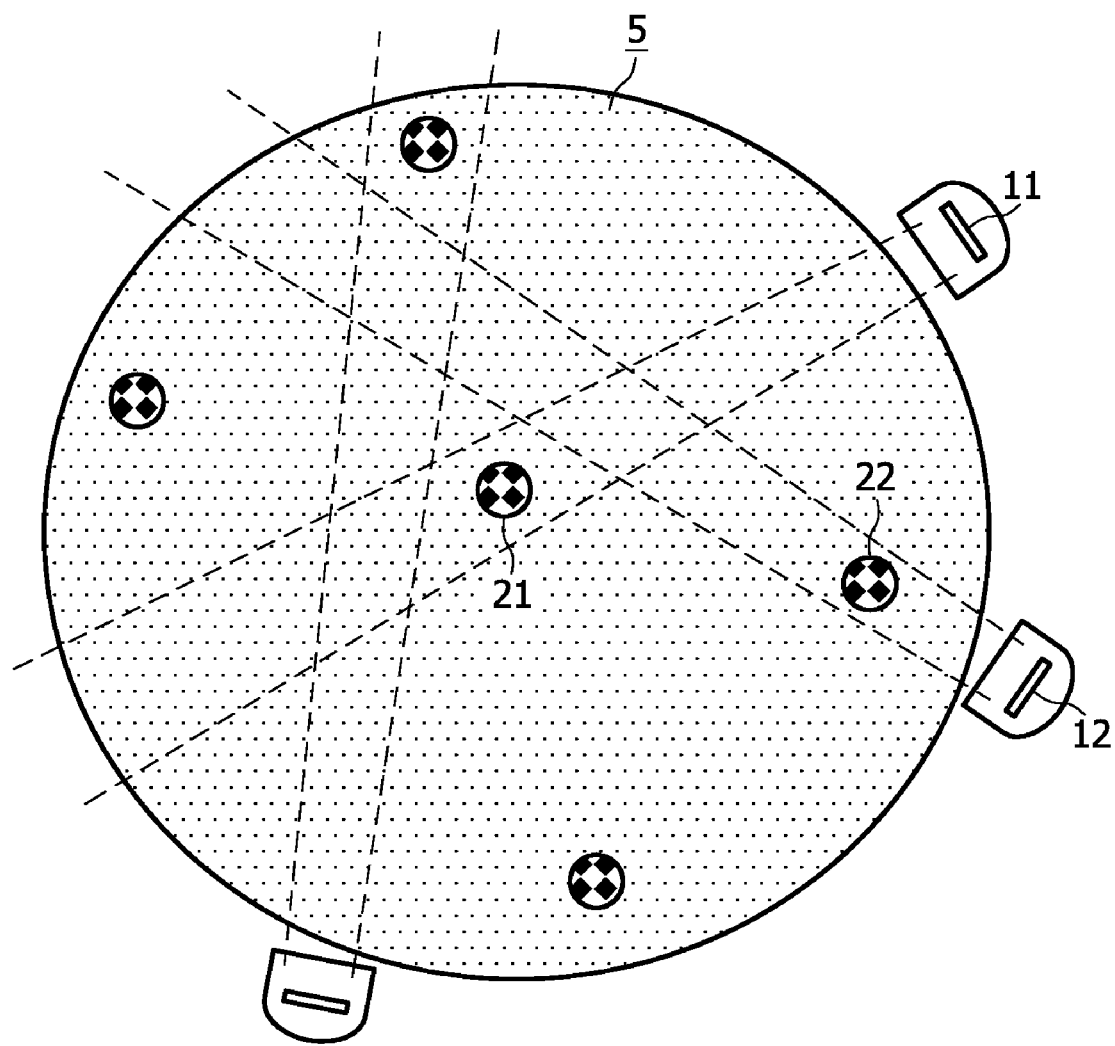
FIG. 3 is a cross-section of another embodiment of the illumination system according to the invention.

FIG. 3 is a schematic cross-section of another embodiment of the illumination system according to the invention. In the example of FIG. 3, the light-sensing plate 5 is viewed from above. Each light sensor 11, 12 has a field of view for receiving diverted light falling within the field of view of the at least one light sensor 11, 12. In principle, the surface-modification structures 21, 22 divert the light traveling through the light-sensing plate 5 in all directions, i.e. in the plane of the drawing of FIG. 3. Only a portion of this diverted light is captured by the light sensors. The first and the second light sensor 11, 12 receive light substantially only from the first and the second surface-modification structures 21, 22 which are in the line of sight of the first or the second light sensor 11, 12, respectively.

Figure 4A:
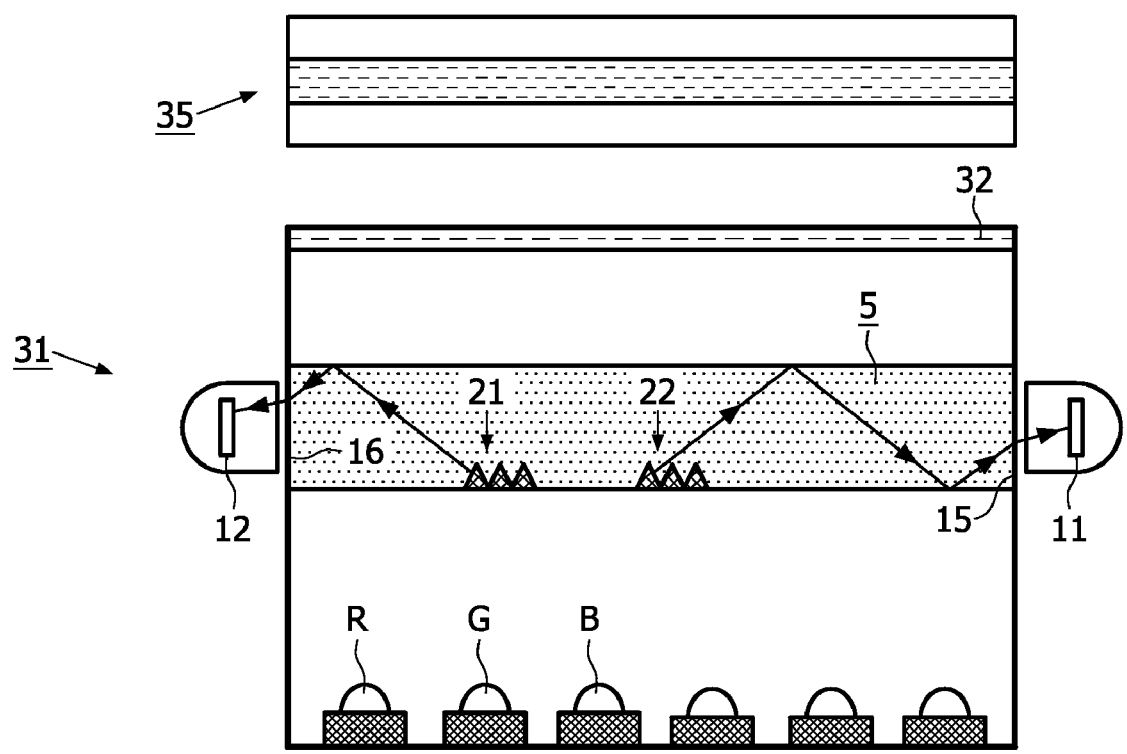
FIG. 4A is a side view of a display device with an illumination system according to the invention.

FIG. 4A is a schematic side view of a display device with an illumination system according to the invention. In the example of FIG. 4A, the display device is a liquid-crystal display device 35. In addition, the at least one light source in FIG. 4A comprises a plurality of light-emitting diodes (LEDs) R, G, B of distinct primary colors. This embodiment of the illumination system further comprises a light-mixing chamber 31 including a light-emission window 32. The light-sensing plate 5 is arranged in the light-mixing chamber 31 between the at least one light source 1, 2 and the light-emission window 2. In an alternative embodiment, the light-sensing plate forms an integral part of the light-emission window and is placed just in front of the light-exit window which is a diffuser plate in many cases and is separated from it by a small air gap. In the embodiment shown in FIG. 4A, all the light emitted by the LEDs R, G, B travels through the light-sensing plate 5, whereas only a minute portion of the light traveling through the light-sensing plate 5 is diverted at the surface-modification structures 21, 22.

Figure 4B:
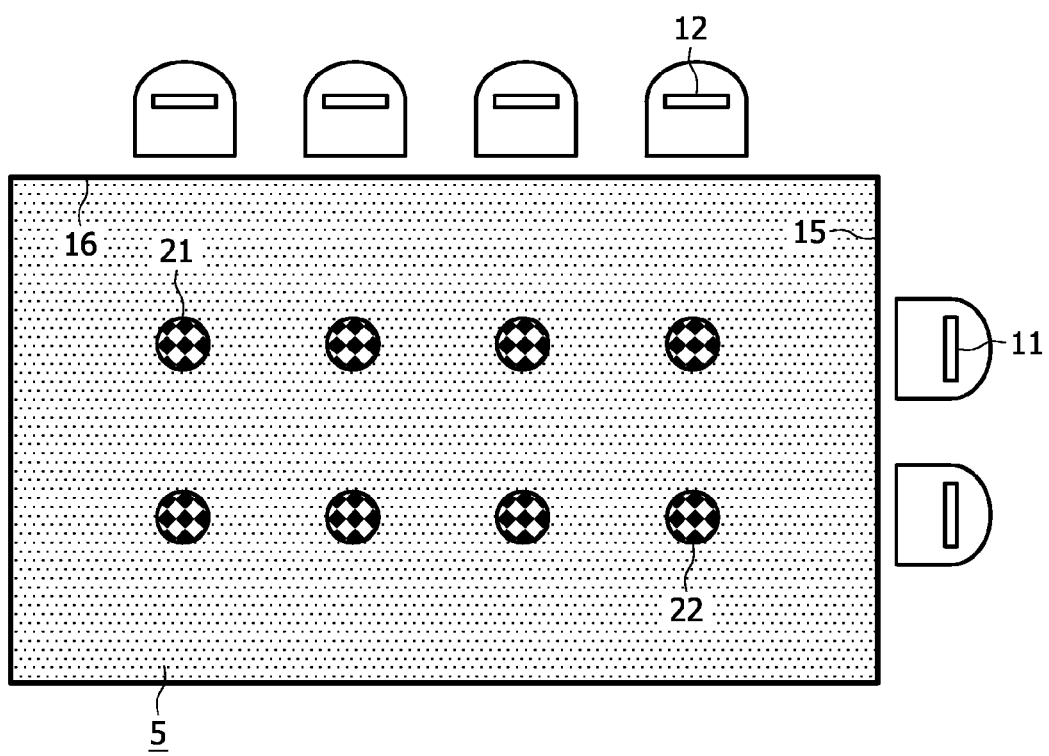
FIG. 4B is a cross-sectional top view of the light-sensing plate as shown in FIG. 4A.

FIG. 4B is a cross-sectional top view of the light-sensing plate 5 as shown in FIG. 4A. Here, two edge surfaces 15, 16 of the light-sensing plate 5 are provided with light sensors 11, 12. In the example of FIG. 4B, the two edge surfaces 15, 16 with the light sensors 11, 12 are arranged perpendicularly with respect to each other. These light sensors 11, 12 receive diverted light from the surface-modification structures 21, 22 arranged at pre-determined positions on the light-sensing plate.

The illumination system according to the invention is simple, relatively easy to manufacture and relatively inexpensive. Moreover, the illumination system according to the invention allows relatively efficient control of the light emitted by the at least one light source by probing the "composition" of the light traveling through the light-sensing plate at certain, pre-determined positions only.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. Use of the article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system comprising:
   a light-transmissive plate, having a first edge surface, a second edge surface, and a light-receiving surface;
   at least one light source emitting light towards and through the light-transmissive plate, the light entering the light-transmissive plate through the light-receiving surface;
   a plurality of surface-modification structures disposed at one or more pre-determined locations on the light-receiving surface of the light-transmissive plate, the surface-modification structures diverting a portion of the light impinging upon said structures towards the first and/or the second edge surface of the light-transmissive plate,
   a first and a second light sensors coupled to the first and the second edge surface of the light-transmissive plate, respectively, for sensing the light diverted at the plurality of surface-modification structures, the light sensors being coupled to a control means for controlling the luminous flux of the at least one light source, wherein the plurality of surface-modification structures comprises first and second surface-modification structures arranged at pre-determined locations on the light-receiving surface of the light-transmissive plate, the first light sensor receiving diverted light substantially exclusively from the first surface-modification structures, and the second light sensor receiving diverted light substantially exclusively from the second surface-modification structures.

2. An illumination system as claimed in claim 1, wherein the at least one light source comprises a plurality of light-emitting diodes.

3. An illumination system as claimed in claim 1, wherein the portion of the light diverted at the surface-modification structures is less than 5% of the total amount of light traveling through the light-transmissive plate.

4. An illumination system comprising:
   at least one light source,
   a light-transmissive plate with light emitted by the at least one light source traveling therethrough
   surface-modification structures disposed at one or more pre-determined locations on a surface of the light-transmissive plate, the surface-modification structures diverting a portion of the light traveling through the light-sensing plate, the diverted light being guided towards an edge surface of the light-transmissive plate, and
   at least one light sensor coupled to the edge surface of the light-transmissive plate for sensing the light diverted at the surface-modification structures, the at least one light sensor being coupled to a control means for controlling the luminous flux of the at least one light source,
   wherein a first and a second light sensor are coupled to a first and a second edge surface of the light-transmissive plate, respectively, and
   wherein first and second surface-modification structures are arranged at pre-determined locations on the surface of the light-transmissive plate, the first light sensor receiving diverted light substantially exclusively from the first surface-modification structures, and the second light sensor receiving diverted light substantially exclusively from the second surface-modification structures.

5. An illumination system, comprising:
   a housing defining a light-mixing chamber having a light-emission window;
   a light-transmissive plate disposed in the light-mixing chamber proximate to the light-emission window, the light-transmissive plate having a first edge surface, a second edge surface, and a light-receiving surface;
   at least one light source disposed in the light-mixing chamber for emitting light towards the light-transmissive plate, the light entering the light-transmissive plate through the light-receiving surface;
   a control means for controlling the luminous flux of the at least one light source;
   a plurality of surface-modification structures disposed at one or more pre-determined locations on the light-receiving surface of the light-transmissive plate, the surface-modification structures diverting a portion of the light traveling through the light-transmissive plate and impinging upon said structures towards the first and/or the second edge surface of the light-transmissive plate, and
   a first and a second light sensors coupled to the first and the second edge surface of the light-transmissive plate, respectively, for sensing the light diverted at the plurality of surface-modification structures, the light sensors being coupled to the control means, wherein the plurality of surface-modification structures comprises first and second surface-modification structures arranged at pre-determined locations on the light-receiving surface of the light-transmissive plate, the first light sensor receiving diverted light substantially exclusively from the first surface-modification structures, and the second light sensor receiving diverted light substantially exclusively from the second surface-modification structures.

6. An illumination system as claimed in claim 5, wherein the light-emission window is arranged such that the light-transmissive plate is disposed between the at least one light source and the light-emission window.

7. An illumination system as claimed in claim 5, wherein the portion of the light diverted at the surface-modification structures is less than 5% of the total amount of light traveling through the light-transmissive plate.

8. An illumination system as claimed in claim 5, wherein the at least one light source comprises a plurality of light-emitting diodes emitting light of at least two different colors.

* * * * *